(12) United States Patent
Byrne et al.

(10) Patent No.: US 8,738,377 B2
(45) Date of Patent: May 27, 2014

(54) PREDICTING AND LEARNING CARRIER PHRASES FOR SPEECH INPUT

(75) Inventors: William J. Byrne, Davis, CA (US); Alexander H. Gruenstein, Moutain View, CA (US); Douglas Beeferman, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 550 days.

(21) Appl. No.: 12/795,257

(22) Filed: Jun. 7, 2010

(65) Prior Publication Data
US 2011/0301955 A1    Dec. 8, 2011

(51) Int. Cl.
*G10L 15/04*    (2013.01)

(52) U.S. Cl.
USPC ........... 704/251; 704/231; 704/235; 704/244; 704/257; 704/270; 704/275; 715/863; 455/417

(58) Field of Classification Search
USPC ................ 704/9, 10, 231, 246, 251, 257
See application file for complete search history.

(56) References Cited

U.S. PATENT DOCUMENTS

| | | | | |
|---|---|---|---|---|
| 5,377,303 | A * | 12/1994 | Firman | 704/275 |
| 5,576,954 | A * | 11/1996 | Driscoll | 1/1 |
| 5,642,502 | A * | 6/1997 | Driscoll | 1/1 |
| 5,708,825 | A * | 1/1998 | Sotomayor | 715/205 |
| 5,754,939 | A * | 5/1998 | Herz et al. | 455/3.04 |
| 5,781,879 | A * | 7/1998 | Arnold et al. | 704/9 |
| 5,915,236 | A * | 6/1999 | Gould et al. | 704/251 |
| 6,088,671 | A * | 7/2000 | Gould et al. | 704/235 |
| 6,308,157 | B1 * | 10/2001 | Vanbuskirk et al. | 704/275 |
| 6,314,420 | B1 * | 11/2001 | Lang et al. | 1/1 |
| 6,327,566 | B1 * | 12/2001 | Vanbuskirk et al. | 704/257 |
| 6,480,819 | B1 * | 11/2002 | Boman et al. | 704/9 |
| 6,519,562 | B1 * | 2/2003 | Phillips et al. | 704/240 |
| 6,587,824 | B1 * | 7/2003 | Everhart et al. | 704/275 |
| 6,742,021 | B1 * | 5/2004 | Halverson et al. | 709/218 |
| 6,975,993 | B1 * | 12/2005 | Keiller | 704/275 |
| 6,999,930 | B1 * | 2/2006 | Roberts et al. | 704/270.1 |
| 7,085,716 | B1 * | 8/2006 | Even et al. | 704/235 |
| 7,219,064 | B2 * | 5/2007 | Nakakita et al. | 704/275 |
| 7,231,343 | B1 * | 6/2007 | Treadgold et al. | 704/9 |
| 7,243,069 | B2 * | 7/2007 | Jaepel et al. | 704/235 |

(Continued)

OTHER PUBLICATIONS

International Search Report and Written Opinion, mailed on Sep. 22, 2011, in corresponding international application No. PCT/US2011/039454.

(Continued)

*Primary Examiner* — Pierre-Louis Desir
*Assistant Examiner* — Fariba Sirjani
(74) *Attorney, Agent, or Firm* — Fish & Richardson P.C.

(57) ABSTRACT

Predicting and learning users' intended actions on an electronic device based on free-form speech input. Users' actions can be monitored to develop of a list of carrier phrases having one or more actions that correspond to the carrier phrases. A user can speak a command into a device to initiate an action. The spoken command can be parsed and compared to a list of carrier phrases. If the spoken command matches one of the known carrier phrases, the corresponding action(s) can be presented to the user for selection. If the spoken command does not match one of the known carrier phrases, search results (e.g., Internet search results) corresponding to the spoken command can be presented to the user. The actions of the user in response to the presented action(s) and/or the search results can be monitored to update the list of carrier phrases.

24 Claims, 4 Drawing Sheets

(56) References Cited

U.S. PATENT DOCUMENTS

| | | | |
|---|---|---|---|
| 7,308,439 B2 * | 12/2007 | Baird et al. | 707/758 |
| 7,313,524 B1 * | 12/2007 | Minamino | 704/270 |
| 7,315,818 B2 * | 1/2008 | Stevens et al. | 704/235 |
| 7,444,324 B2 * | 10/2008 | Ortega et al. | 1/1 |
| 7,487,085 B2 * | 2/2009 | Ativanichayaphong et al. | 704/235 |
| 7,533,018 B2 * | 5/2009 | Ma et al. | 704/244 |
| 7,590,536 B2 * | 9/2009 | Bates et al. | 704/244 |
| 7,668,710 B2 * | 2/2010 | Doyle | 704/9 |
| 7,720,683 B1 * | 5/2010 | Vermeulen et al. | 704/254 |
| 7,856,441 B1 * | 12/2010 | Kraft et al. | 707/758 |
| 7,885,818 B2 * | 2/2011 | Vignoli | 704/275 |
| RE42,868 E * | 10/2011 | Attwater et al. | 704/231 |
| 8,099,287 B2 * | 1/2012 | Bodin et al. | 704/275 |
| 8,132,126 B2 * | 3/2012 | Wilson | 715/863 |
| 8,150,700 B2 * | 4/2012 | Shin et al. | 704/275 |
| 8,180,630 B2 * | 5/2012 | Goud et al. | 704/10 |
| 8,265,933 B2 * | 9/2012 | Bates et al. | 704/270 |
| 8,296,130 B2 * | 10/2012 | Spears | 704/9 |
| 8,311,829 B2 * | 11/2012 | Longe et al. | 704/257 |
| 8,352,264 B2 * | 1/2013 | White et al. | 704/255 |
| 8,380,514 B2 * | 2/2013 | Bodin et al. | 704/270 |
| 8,447,602 B2 * | 5/2013 | Bartosik et al. | 704/235 |
| 8,532,990 B2 * | 9/2013 | Hillebrecht et al. | 704/243 |
| 8,543,407 B1 * | 9/2013 | Gagnon et al. | 704/275 |
| 8,606,582 B2 * | 12/2013 | Longe et al. | 704/257 |
| 8,620,667 B2 * | 12/2013 | Andrew | 704/275 |
| 2002/0049596 A1 * | 4/2002 | Burchard et al. | 704/270 |
| 2002/0123994 A1 | 9/2002 | Schabes et al. | |
| 2002/0193989 A1 * | 12/2002 | Geilhufe et al. | 704/208 |
| 2002/0198882 A1 * | 12/2002 | Linden et al. | 707/10 |
| 2003/0063113 A1 * | 4/2003 | Andrae | 345/700 |
| 2003/0125929 A1 * | 7/2003 | Bergstraesser et al. | 704/9 |
| 2004/0111259 A1 | 6/2004 | Miller et al. | |
| 2004/0210437 A1 * | 10/2004 | Baker | 704/251 |
| 2005/0071741 A1 | 3/2005 | Acharya et al. | |
| 2005/0149332 A1 * | 7/2005 | Kuzunuki et al. | 704/270.1 |
| 2006/0036430 A1 * | 2/2006 | Hu | 704/10 |
| 2006/0069564 A1 * | 3/2006 | Allison et al. | 704/257 |
| 2006/0116877 A1 * | 6/2006 | Pickering et al. | 704/231 |
| 2006/0200336 A1 * | 9/2006 | Cipollone et al. | 704/4 |
| 2006/0247914 A1 * | 11/2006 | Brener et al. | 704/1 |
| 2007/0088556 A1 * | 4/2007 | Andrew | 704/270.1 |
| 2007/0265849 A1 * | 11/2007 | Grost et al. | 704/257 |
| 2008/0046250 A1 * | 2/2008 | Agapi et al. | 704/275 |
| 2008/0059188 A1 * | 3/2008 | Konopka et al. | 704/257 |
| 2008/0275704 A1 * | 11/2008 | Portele et al. | 704/257 |
| 2008/0290987 A1 * | 11/2008 | Li | 340/5.1 |
| 2009/0019028 A1 | 1/2009 | Norris et al. | |
| 2009/0132926 A1 * | 5/2009 | Bucha | 715/730 |
| 2009/0171664 A1 | 7/2009 | Kennewick et al. | |
| 2009/0292528 A1 * | 11/2009 | Kameyama | 704/9 |
| 2010/0009720 A1 * | 1/2010 | Cha et al. | 455/566 |
| 2010/0169098 A1 * | 7/2010 | Patch | 704/275 |
| 2010/0179812 A1 * | 7/2010 | Jang et al. | 704/244 |
| 2010/0332217 A1 * | 12/2010 | Wintner et al. | 704/9 |
| 2011/0201300 A1 * | 8/2011 | Ornstein | 455/404.1 |
| 2011/0208513 A1 * | 8/2011 | Nicks et al. | 704/10 |
| 2011/0244843 A1 * | 10/2011 | Shostak | 455/417 |
| 2011/0251839 A1 * | 10/2011 | Achtermann et al. | 704/9 |
| 2013/0110520 A1 * | 5/2013 | Cheyer et al. | 704/275 |
| 2013/0124194 A1 * | 5/2013 | Nadal | 704/9 |
| 2013/0141516 A1 * | 6/2013 | Baldwin | 348/14.03 |

OTHER PUBLICATIONS

Notification Concerning Transmittal of the International Preliminary Report on Patentability issued in PCT/US2011/039454 on Dec. 20, 2012, 8 pages.

* cited by examiner

PREDICTING AND LEARNING CARRIER PHRASES FOR SPEECH INPUT

TECHNICAL FIELD

The present disclosure relates generally to speech recognition, and more specifically, to methods and systems for predicting and learning users' intended actions based on free-form speech input.

BACKGROUND

Speech-based input is often used to trigger various actions on electronic devices. For example, some mobile telephones allow for one or more voice commands to trigger various operations. A user may call a contact by speaking a command and the name of a contact stored in the user's address book. In addition, some global position system ("GPS") devices allow a user to enter certain commands via speech input. For example, a user may speak the phrase "Go Home" and the GPS receiver may, in turn, provide directions from the current location to the user's home.

Typically, traditional speech-input capable devices require an exact match between a spoken phrase and a "carrier phrase" that corresponds to a desired action. The devices typically include a list of predefined carrier phrases that each correspond to a particular action. For example, a carrier phrase for obtaining directions on a GPS device may be "Navigate to" followed by an address or a name of a location. If the user speaks one of the predefined carrier phrases, the device can recognize the carrier phrase and perform the corresponding action. However, if the spoken phrase is not included in the list of predefined carrier phrases, the action will not be triggered even if the spoken phrase has the same or a similar meaning as the predetermined carrier phrase. For example, the phrase "Navigate to" may be recognized by a GPS device, while the phrase "Drive to" is not.

This use of predefined carrier phrases requires a user to learn the appropriate phrases for use with a particular device or application. However, many users are not willing to invest the time to learn these phrases and therefore do not take advantage of this feature. In addition, users may become frustrated if they speak a phrase close to, but not exactly matching one of the predefined carrier phrases. For example, the user may speak the phrase "Navigate me to" instead of "Navigate to" and become frustrated when the phrase is not recognized by the device.

Therefore, a need exists in the art for an improved means for determining users' intended actions based on speech input.

SUMMARY

In one exemplary embodiment, a computer-implemented method for predicting and learning carrier phrases for speech input can include receiving, from a user, a first speech input including a first command. A carrier phrase module can determine whether the first command corresponds to a known carrier phrase by comparing at least a portion of the first command to a list of known carrier phrases. Each known carrier phrase can correspond to at least one computer-implemented action. In response to determining that the first command corresponds to a known carrier phrase, at least one link can be displayed, each link actuatable to initiate the at least one computer-implemented action corresponding to the known carrier phrase; user activity with respect to the displayed at least one link can be monitored; and the carrier phrase application can update a relevance score associated with the known carrier phrase based on the monitored user activity. A second speech input including the first command can be received. At least one link can be displayed according to the updated relevance score. The carrier phrase module can be implemented in a computer system that includes instructions stored in a machine-readable medium and a processor that executes the instructions.

In another exemplary embodiment, a computer-implemented method for identifying and executing a speech command can include receiving a first speech input including a first command. A carrier phrase module can determine whether the first command corresponds to a known carrier phrase by comparing at least a portion of the first command to a list of known carrier phrases. In response to determining that the first command does not correspond to a known carrier phrase, at least one Internet search result corresponding to the first speech input can be displayed, user activity in response to the displayed search result can be monitored; and the list of known carrier phrases can be updated to include (a) a new known carrier phrase corresponding to the first command, and (b) an action associated with the new known carrier phrase, the action previously initiated by the user in response to the displayed search results. After updating the list, a second speech input including the first command can be received from the user; a known carrier phrase corresponding to the first command can be identified by comparing the first command to the updated list of known carrier phrases; and the action associated with the identified carrier phrase can be executed.

In yet another exemplary embodiment, a computer program product has a computer-readable storage medium having computer-readable program code embodied therein for identifying and executing a speech command. The computer program product can include computer-readable program code for receiving, from a user, a first speech input including a first command; computer-readable program code for determining whether the first command corresponds to a known carrier phrase by comparing at least a portion of the first command to a list of known carrier phrases, each known carrier phrase corresponding to one or more computer-implemented actions; and computer-readable program code for, in response to determining that the first command does correspond to a known carrier phrase, causing one or more links to be displayed, each link actuatable to initiate one of the one or more computer-implemented actions that correspond to the one of the known carrier phrases; monitoring user activity with respect to the displayed one or more links; and updating a relevance score associated with the one of the known carrier phrases based on the monitored user activity.

In yet another exemplary embodiment, a computer program product has a computer-readable storage medium having computer-readable program code embodied therein for identifying and executing a speech command. The computer program product can include computer-readable program code for receiving, from a user, a first speech input comprising a first command; computer-readable program code for determining whether the first command corresponds to a known carrier phrase by comparing at least a portion of the first command to a list of known carrier phrases, each known carrier phrase corresponding to one or more computer-implemented actions; computer-readable program code for, in response to determining that the first command does correspond to a known carrier phrase, causing one or more links to be displayed, each link actuatable to initiate one of the one or more computer-implemented actions that correspond to the one of the known carrier phrases; monitoring user activity with respect to the displayed one or more links; and updating a relevance score associated with the one of the known carrier phrases based on the monitored user activity. The computer program product also can include computer-readable program code for, in response to determining that the first command does not correspond to a known carrier phrase, causing at least one Internet search result corresponding to the first speech input to be displayed; monitoring user activity in response to the displayed search result; and updating the known carrier phrases to include (a) a new known carrier phrase corresponding to the first command, and (b) an action associated with the new known carrier phrase, the action previously initiated by the user in response to the displayed search results.

These and other aspects, features and embodiments of the invention will become apparent to a person of ordinary skill in the art upon consideration of the following detailed description of illustrated embodiments exemplifying the best mode for carrying out the invention as presently perceived.

DETAILED DESCRIPTION OF EXEMPLARY EMBODIMENTS

Overview

Figure 1:
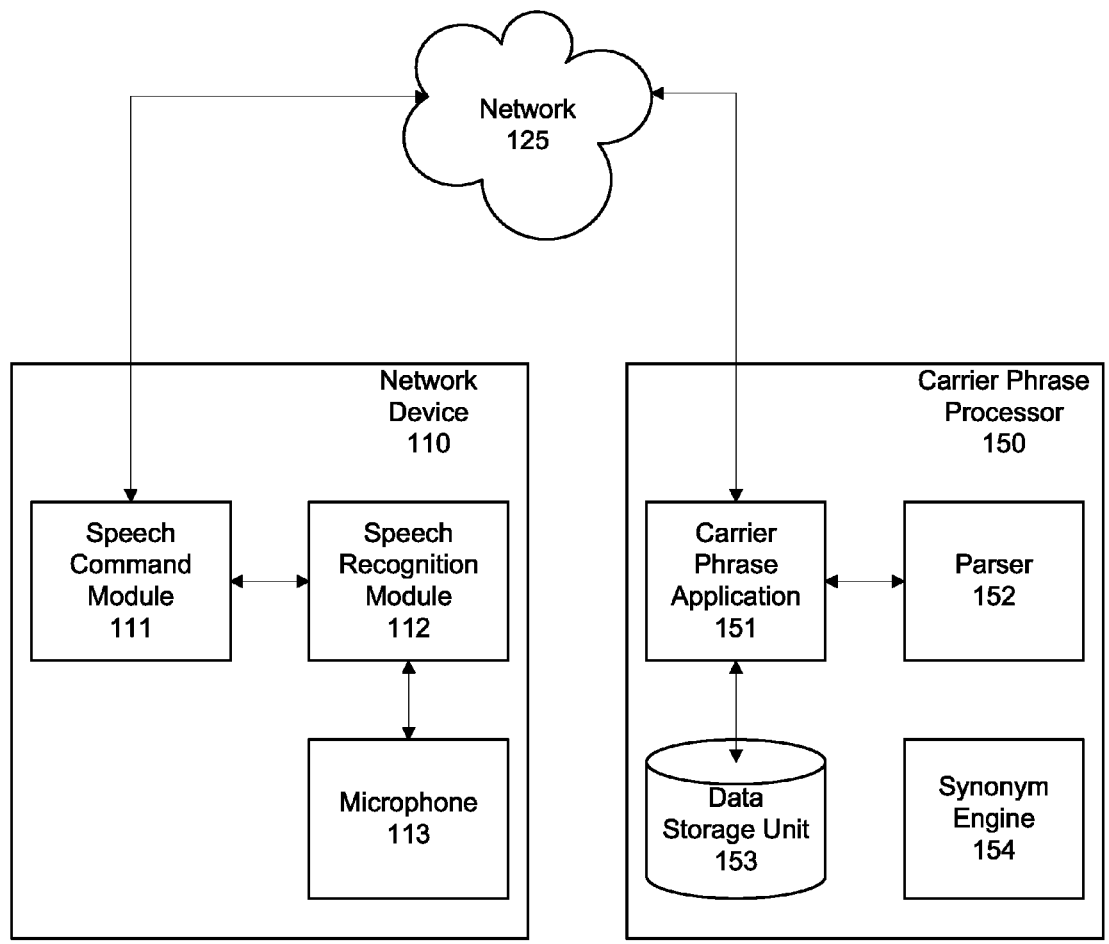
FIG. 1 is a block diagram depicting a system for predicting and learning carrier phrases, in accordance with certain exemplary embodiments.

Methods and systems predict and learn users' intended commands based on free-form speech input. The systems and methods can determine users' intended actions based on (1) an initial set of carrier phrases (e.g., "Directions to <location>"), (2) a list of known carrier phrases or a semantic network that associates linguistically similar phrases with actions, and (3) a feedback loop of user actions logged against spoken phrases, which associates the phrase's level of relevance with each action. The systems and methods can be used to predict and learn phrases associated with various actions that can be performed by an electronic device and/or applications stored on the electronic device, such as dialing a telephone number, obtaining directions via a GPS application, or performing an Internet search for a video, an image, a map, news, weather, or any other type of information.

A user can provide a command to an electronic device by speaking a phrase, such as "Drive to New York City." A speech recognition module can convert the speech input to text and a parser can parse a "carrier phrase" from the text. Carrier phrases may include an action word or phrase, such as "Drive to," that is associated with an intended command. A carrier phrase application can compare the parsed carrier phrase to known carrier phrases that each correspond to one or more actions that the device can perform. The carrier phrase application also can include or cause separate synonym logic to determine if the parsed carrier phrase is semantically similar to one or more of the known carrier phrases. If the parsed carrier phrase matches one or more of the known carrier phrases, whether by being identical to the known carrier phrase or semantically similar to the known carrier phrase, the device can present, for each matching known carrier phrase, an actuatable link for initiating an action corresponding to the matching carrier phrase. If there are multiple matching carrier phrases, a list of actuatable links for multiple corresponding actions may be displayed.

In one example, a user may speak the phrase "Drive to New York City." The parser can parse the carrier phrase "Drive to" from the spoken phrase. The carrier phrase application can compare the parsed carrier phrase "Drive to" to a list of known carrier phrases. If the carrier phrase application does not find an identical match for the carrier phrase "Drive to," it can cause the synonym logic to determine if the phrase "Drive to" is similar to one or more of the known carrier phrases. For example, the synonym logic may find that the parsed carrier phrase "Drive to" is semantically similar to known carrier phrases "Directions to" and "Navigate to." The device can display a list of selectable actions corresponding to each known carrier phrase that is semantically similar to the parsed carrier phrase (i.e., for the above example, "Directions to" and "Navigate to"). Continuing the example for the parsed carrier phrase "Drive to," the displayed list may include an actuatable link labeled, "Directions to New York," corresponding to an action involving obtaining directions to New York. For example, when selected, that link may launch a map application illustrating directions from the current location of the device (e.g., determined by GPS) to New York. The displayed list also may include an actuatable link labeled, "Navigate to New York," that when selected, launches a GPS application that provides turn by turn directions from the current location of the device to New York.

If an identical or similar match is not found for the parsed carrier phrase, the carrier phrase application can trigger a search, such as an Internet search, for the spoken phrase, the parsed carrier phrase, or a portion of the spoken phrase or parsed carrier phrase. The carrier phrase application can monitor the user's actions after a list of one or more actuatable links/actions or search results are presented and record those user actions. For example, after presenting the list of actuatable links/actions including, "Directions to New York" and "Navigate to New York," the carrier phrase application can monitor the user's link selection and record that selection. The carrier phrase application can update the list of known carrier phrases based on that selection so that, if the same spoken phrase (or the parsed portion thereof) is used again, the appropriate action can be performed or the appropriate link/action can be presented higher (e.g., at the top) in the list of links/actions.

System Architecture

Turning now to the drawings, in which like numerals indicate like elements throughout the figures, exemplary embodiments are described in detail. FIG. 1 is a block diagram depicting a system 100 for predicting and learning carrier phrases, in accordance with certain exemplary embodiments. The system 100 includes one or more network devices 110 that are each in communication with a carrier phrase processor 150 via a network 125. The network 125 can include a wired or wireless network. For example, the network 125 can include a local area network ("LAN"), a wide area network ("WAN"), an intranet, the Internet, a mobile telephone network, or any combination thereof. In certain alternative exemplary embodiments, the carrier phrase processor 150 may be incorporated in the network device 110.

The network device 110 can include a mobile telephone, a personal digital assistant ("PDA"), a laptop computer, a desktop computer, a handheld computer, or any other wired or wireless processor-driven device. In certain exemplary embodiments, the network device 110 includes a microphone 113, a speech recognition module 112, and a speech command module 111. Additional components that may be included in the network device 100 are described below in connection with FIG. 2. A user can provide a command to the network device 110 by speaking a word or phrase into the microphone 113. The speech recognition module 112 can receive the speech input from the microphone 113, convert the speech input to text, and provide the converted text to the speech command module 111.

The speech command module 111 can interact with the carrier phrase processor 150 to determine or predict what, if any, action is intended by the received speech input. In certain exemplary embodiments, the carrier phrase processor 150 can include or be incorporated in one or more computers, servers, and/or web servers. The carrier phrase processor 150 includes a carrier phrase application 151 that can receive the converted text from the speech command module 111 and provide the converted text to a parser 152. The parser 152 can parse a carrier phrase from the text and provide the parsed carrier phrase to the carrier phrase application 151. In certain exemplary embodiments, the parser 152 compares each word or phrase in the text to a list of carrier phrases and extracts any matching word or phrase.

The carrier phrase application 151 can compare the parsed carrier phrase to known carrier phrases that each correspond to one or more actions. In certain exemplary embodiments, the known carrier phrases may be stored in a data storage unit 153, as a list that includes carrier phrases and their corresponding action(s), or in a semantic network having semantic relationships between the known carrier phrases and their corresponding actions. The known carrier phrases may be stored with or without an associated command subject. For example, a known carrier phrase "Drive to" may be stored as "Drive to" or as "Drive to <location>." Each known carrier phrase can include a relevance score for each corresponding action that indicates the likelihood that a user intends to have that action performed when the user says that carrier phrase.

In certain exemplary embodiments, the carrier phrase processor 150 also includes a synonym engine 154, which includes logic for determining if the parsed carrier phrase is semantically similar to a known carrier phrase. For example, the synonym engine 154 may conclude that a parsed carrier phrase "drive to" is semantically similar to known carrier phrases "directions to" and "navigate to" using the semantic network. In certain alternative exemplary embodiments, the synonym logic may be included in another module or component of the carrier phrase processor 150, such as the carrier phrase application 151.

If the parsed carrier phrase identically matches or is semantically similar to one or more of the known carrier phrases, the carrier phrase application 151 can communicate information associated with the identically matching or similar carrier phrase(s) to the speech command module 111. This information can include an identification of the action itself, an identification of an application that performs the action, and/or a relevance score for the action, for example. If the parsed carrier phrase does not identically match and is not similar to at least one of the known carrier phrases, the carrier phrase application 151 can communicate this to the speech command module 111.

The speech command module 111 can enable the user to select from actions corresponding to identically matching or semantically similar carrier phrases. For example, the speech command module 111 may display a selectable list of the actions. In certain exemplary embodiments, the list may be ordered based on the relevance scores for each of the actions. If there are no identically matching or semantically similar known carrier phrases for the parsed carrier phrase, the speech command module 111 can cause a search, such as an Internet search, to be performed using the converted text. The speech command module 111 can monitor the user's actions and communicate with the carrier phrase application 151 to update the list of known carrier phrases based on the user's actions. For example, if the user selects one of the actions for an identically matching or semantically similar carrier phrase, the carrier phrase application 151 can update the relevance score for the selected action and the carrier phrase to indicate that the selected action is more relevant to the parsed carrier phrase. In addition or in the alternative, the carrier phrase application 151 may update the relevance score for each other matching action that was not selected to indicate that the non-selected actions are less relevant to the parsed carrier phrase.

If the parsed carrier phrase is a new carrier phrase (i.e., if there is no matching carrier phrase), then the carrier phrase application 151 can add the parsed carrier phrase and any selected action to the list of known carrier phrases. For example, the speech command module 111 may call an Internet web browser to perform a search for the phrase "Map the Golden Gate Bridge." In response, the web browser may display search results including a map that shows the location of the Golden Gate Bridge. If the user selects the map, then the carrier phrase application 151 can associate the carrier phrase "Map" with the action of displaying a map of a location.

The system 100 can be used to learn and predict carrier phrases for a single user or for a population of multiple users. For example, the carrier phrase processor 150 can communicate with multiple network devices 110 to monitor multiple users' actions and learn carrier phrases corresponding to the aggregate of the users' actions. In addition or in the alternative, the system 100 may be used to learn and predict carrier phrases for individual users only. In such embodiments, the components of the carrier phrase processor 150 can be included with the network device 110. That is, in certain exemplary embodiments, the network device 110 can include a carrier phrase application 151, a parser 152, a storage unit 153 for storing known carrier phrases, and a synonym engine 154.

Figure 2:
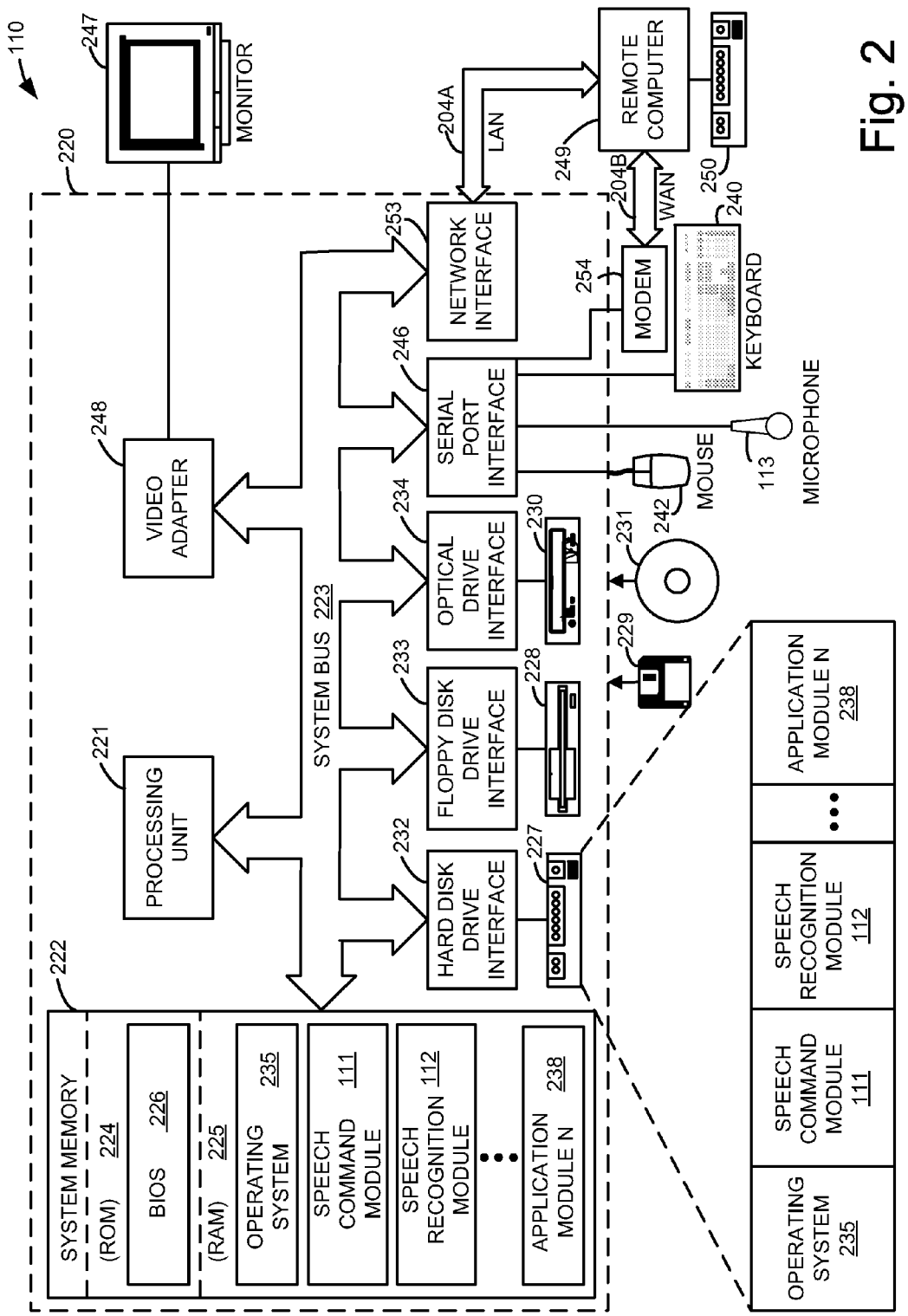
FIG. 2 is a block diagram depicting a general component architecture for a network device, in accordance with certain exemplary embodiments.

FIG. 2 is a block diagram depicting a general component architecture for a network device 110, in accordance with certain exemplary embodiments. As described above, the network device 110 can include a mobile telephone, a PDA, a laptop computer, a desktop computer, a handheld computer, or any other wired or wireless processor-driven device. For simplicity, the exemplary device 110 is described herein as a personal computer 220. A person of ordinary skill in the art having the benefit of the present disclosure will recognize that certain components of the device 110 may be added, deleted, or modified in certain alternative embodiments. For example, a mobile phone or handheld computer may not include all of the components depicted in FIG. 2 and/or described below.

Generally, the computer 220 includes a processing unit 221, a system memory 222, and a system bus 223 that couples various system components, including the system memory 222, to the processing unit 221. The system bus 223 can include any of several types of bus structures, including a memory bus or memory controller, a peripheral bus, or a local bus, using any of a variety of bus architectures. The system memory 222 includes a read-only memory ("ROM") 224 and a random access memory ("RAM") 225. A basic input/output system (BIOS) 226 containing the basic routines that help to transfer information between elements within the computer 220, such as during start-up, is stored in the ROM 224.

The computer 220 also includes a hard disk drive 227 for reading from and writing to a hard disk (not shown), a magnetic disk drive 228 for reading from or writing to a removable magnetic disk 229 such as a floppy disk, and an optical disk drive 230 for reading from or writing to a removable optical disk 231 such as a CD-ROM, compact disk-read/write (CD/RW), DVD, or other optical media. The hard disk drive 227, magnetic disk drive 228, and optical disk drive 230 are connected to the system bus 223 by a hard disk drive interface 232, a magnetic disk drive interface 233, and an optical disk drive interface 234, respectively. Although the exemplary device 110 employs a ROM 224, a RAM 225, a hard disk drive 227, a removable magnetic disk 229, and a removable optical disk 231, it should be appreciated by a person of ordinary skill in the art having the benefit of the present disclosure that other types of computer readable media also can be used in the exemplary device 110. For example, the computer readable media can include any apparatus that can contain, store, communicate, propagate, or transport data for use by or in connection with one or more components of the computer 220, including any electronic, magnetic, optical, electromagnetic, infrared, or semiconductor system (or apparatus or device) or propagation medium, such as magnetic cassettes, flash memory cards, digital video disks, Bernoulli cartridges, and the like. The drives and their associated computer readable media can provide nonvolatile storage of computer-executable instructions, data structures, program modules, and other data for the computer 220.

A number of modules can be stored on the ROM 224, RAM 225, hard disk drive 227, magnetic disk 229, or optical disk 231, including an operating system 235 and various application modules 111, 112, and 238. Application modules 111, 112, and 238 can include routines, sub-routines, programs, objects, components, data structures, etc., which perform particular tasks or implement particular abstract data types. Application modules 111 and 112, are discussed in more detail below, with reference to FIGS. 3-4.

Application modules, such as application module 238, can include a telephone dialing application, an Internet web browser, a GPS application, a mapping application, or any other type of software application. These application modules may interact with the speech command module 111 to receive instructions received via speech input as described in more detail below with reference to FIGS. 3-4.

A user can enter commands and information to the computer 220 through input devices, such as a keyboard 240 and a pointing device 242. The pointing device 242 can include a mouse, a trackball, an electronic pen that can be used in conjunction with an electronic tablet, or any other input device known to a person of ordinary skill in the art, such as a microphone 113, joystick, game pad, satellite dish, scanner, or the like. These and other input devices are often connected to the processing unit 222 through a serial port interface 246 that is coupled to the system bus 223, but can be connected by other interfaces, such as a parallel port, game port, a universal serial bus (USB), or the like. A display device 247, such as a monitor, also can be connected to the system bus 223 via an interface, such as video adapter 248. In addition to the display device 247, the computer 220 can include other peripheral output devices, such as speakers (not shown) and a printer (not shown).

The computer 220 is configured to operate in a networked environment using logical connections to one or more remote computers 249, such as a carrier phrase processor 150. The remote computer 249 can be any network device, such as a personal computer, a server, a client, a router, a network PC, a peer device, or other device. While the remote computer 249 typically includes many or all of the elements described above relative to the computer 220, only a memory storage device 250 has been illustrated in FIG. 2 for simplicity. The logical connections depicted in FIG. 2 include a LAN 204A and a WAN 204B. Such networking environments are commonplace in offices, enterprise-wide computer networks, intranets, and the Internet.

When used in a LAN networking environment, the computer 220 is often connected to the LAN 204A through a network interface or adapter 253. When used in a WAN networking environment, the computer 220 typically includes a modem 254 or other means for establishing communications over the WAN 204B, such as the Internet. The modem 254, which can be internal or external, is connected to system bus 223 via a serial port interface 246. In a networked environment, program modules depicted relative to computer 220, or portions thereof, can be stored in the remote memory storage device 250.

It will be appreciated that the network connections shown are exemplary and other means of establishing a communications link between the computers can be used. Moreover, those skilled in the art will appreciate that the device 110 illustrated in FIG. 2 can have any of several other suitable computer system configurations.

Process

The components of the system 100 are described hereinafter with reference to the exemplary methods illustrated in FIGS. 3-4. The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, a skilled programmer would be able to write such computer programs to implement exemplary embodiments based on the flow charts and associated description in the application text. Therefore, disclosure of a particular set of program code instructions is not considered necessary for an adequate understanding of how to make and use the exemplary embodiments. Further, those skilled in the art will appreciate that one or more blocks described may be performed by hardware, software, or a combination thereof, as may be embodied in one or more computing systems.

Figure 3:
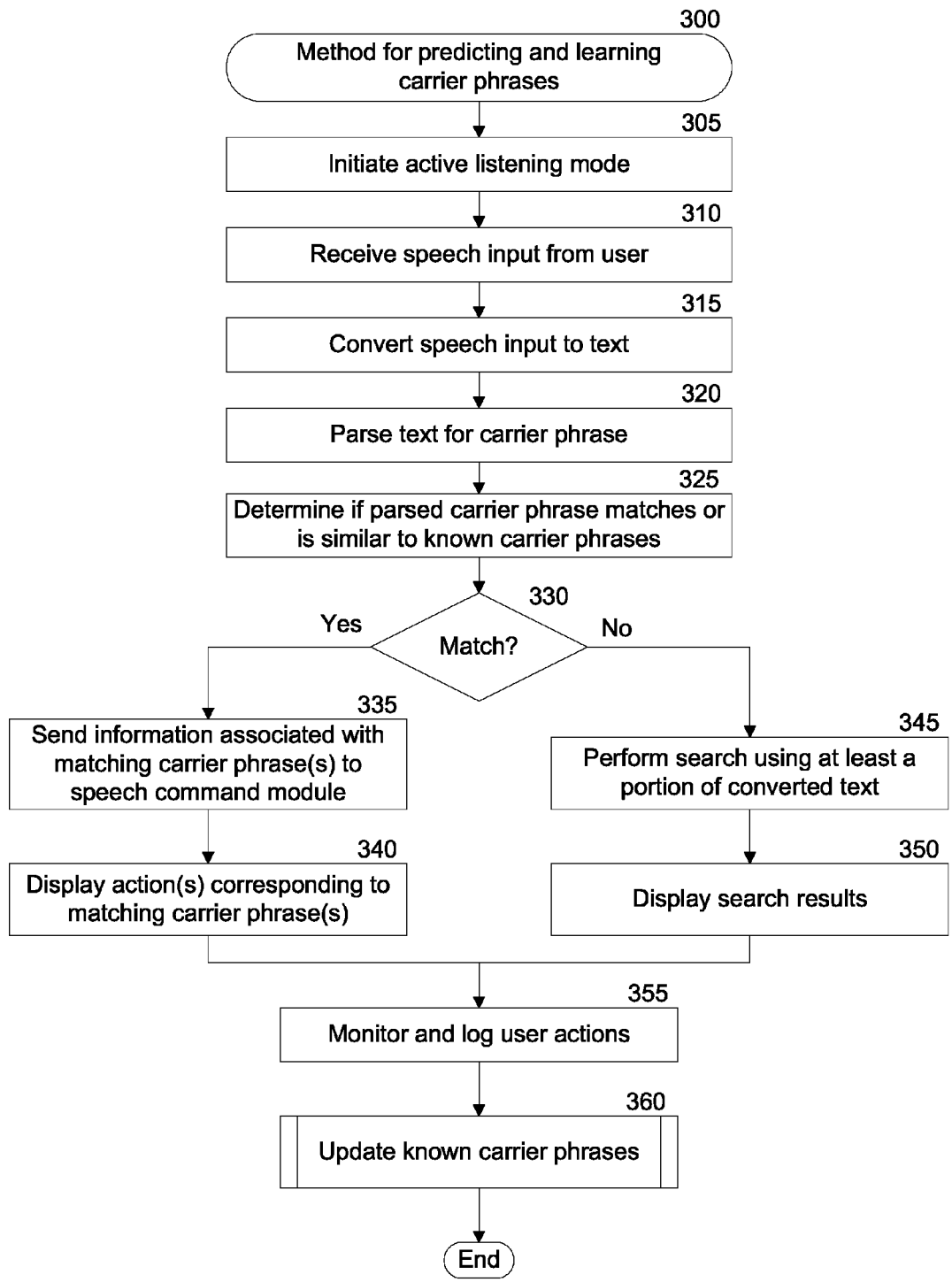
FIG. 3 is a flow chart depicting a method for predicting and learning carrier phrases, in accordance with certain exemplary embodiments.

FIG. 3 is a flow chart depicting a method 300 for predicting and learning carrier phrases, in accordance with certain exemplary embodiments. The method 300 may be performed using a computer program product having a computer-readable storage medium with computer program instructions embodied thereon for performing the method 300. The method 300 is described hereinafter with reference to FIGS. 1-3.

In block 305, the network device 110 is placed into an active listening mode where the network device 110 is awaiting a command to be entered via speech input. For example, a user may initiate the active listening mode by making a selection via a user interface of the network device 110 or by pressing a button on the network device 110. Alternatively, the network device 110 may continuously operate in an active listening mode.

In block 310, a user provides a command via speech input to the microphone 113. The speech input may include a carrier phrase containing an action word or phrase and a subject of the command. For example, the speech input may include the carrier phrase "Drive to" and a location, "Golden Gate Bridge." Another example of speech input may include the carrier phrase "Call" and a contact or name, such as "Joe." As would be recognized by a person of ordinary skill in the art having the benefit of the present disclosure, infinite other phrases are possible.

In block 315, the speech recognition module 112 converts the speech input to text for processing by the parser 152. In the illustrated embodiment, the speech recognition module 112 sends the converted text to the speech command module 111, and the speech command module 111, in turn, sends the converted text to the carrier phrase application 151 of the carrier phrase processor 150 via the network 125. The carrier phrase application 151 sends the converted text to the parser 152. In certain alternative exemplary embodiments, such as embodiments where the parser 152 is stored on or coupled to the network device 110, the speech recognition module 112 may send the converted text directly to the parser 152.

In block 320, the parser 152 parses the converted text. In certain exemplary embodiments, such parsing involves the parser 152 extracting the carrier phrase from the converted text. The parser 152 may detect an action word or action phrase, and extract that action word or phrase from the converted text. Continuing the Golden Gate Bridge example from above, the parser 152 may extract the phrase "Drive to" or the word "Drive" from converted text that includes the phrase "Drive to Golden Gate Bridge." The parser 152 can separate the phrase into a carrier phrase, such as "Drive to" and the subject of the spoken command, such as "Golden Gate Bridge." The parser 152 sends the parsed text to the carrier phrase application 151.

In block 325, the carrier phrase application 151 compares the parsed carrier phrase, and optionally the subject of the command, to known carrier phrases to determine if there is an identical or semantically similar match. In certain exemplary embodiments, the carrier phrase application 151 compares the carrier phrase to a list of known carrier phrases, each being associated with one or more corresponding actions. In certain exemplary embodiments, the carrier phrase application 151 compares the parsed carrier phrase to a semantic network that links known carrier phrases with corresponding actions. An exemplary semantic network can include a network of nodes, each node including a carrier phrase and one or more corresponding actions. Carrier phrases having a similar meaning or one or more similar or matching actions may be linked in the semantic network. In certain exemplary embodiments, the carrier phrase application 151 uses the synonym engine 154 to determine if the parsed carrier phrase is a semantically similar match to a known carrier phrase.

In block 330, the carrier phrase application 151 determines whether the parsed carrier phrase is an identical or semantically similar match to one or more of the known carrier phrases. If so, the method 300 branches to block 335. If the parsed carrier phrase does not match and is not similar to one of the known carrier phrases, the method 300 branches to block 340, which is described below.

In block 335, the carrier phrase application 151 sends information associated with the matching carrier phrase(s) to the speech command module 111. This information can include, among other things, one or more actions corresponding to each matching carrier phrase, a relevance score for each such action, and an indication of an application program 238 at the network device 110 that can complete each such action.

In block 340, the speech command module 111 causes information identifying the matching action(s) to be displayed to the user. For example, in certain exemplary embodiments, the speech command module 111 displays a selectable or otherwise actuatable link for each action or a portion of the actions corresponding to each (identical or semantically similar) matching carrier phrase. These links may be ordered based on the relevance score for the action with respect to the parsed carrier phrase. In certain exemplary embodiments, a link to perform a search using the speech input also may be provided by the speech command module 111. For example, a list of actions may include a link to perform an Internet search using the speech input. This provides the user an additional option in case the user intended for the speech input to trigger a different action than the other actions presented to the user in block 340.

In certain exemplary embodiments, an action corresponding to a matching known carrier phrase may be completed automatically, without displaying a link to complete the action. For example, if the speech input includes the phrase "Dial Home," a known carrier phrase having a single corresponding action (e.g., dial the telephone number of the contact spoken after the phrase "Dial"), that action may be performed without displaying a list of possible actions. In another example, if one of multiple actions for a known carrier phrase has a significantly higher relevance score for the parsed carrier phrase than any other corresponding action, then that action having the high relevance score may be performed instead of displaying a list of available actions.

Referring back to block 330, if the parsed carrier phrase does not match any of the known carrier phrases, whether identically or through semantic similarity, the method 300 branches to block 345. In block 345, the speech command module 111 causes a search to be performed using at least a portion of the converted text corresponding to the speech input. For example, the speech command module 111 may call an Internet web browser application to navigate to a search engine website and populate a search field of the search engine web site with the converted text.

In block 350, the speech command module 111 causes the search results to be presented to the user. In certain exemplary embodiments, these search results may include links to websites related to the parsed carrier phrase of the speech input. For example, if the speech input includes the phrase, "Show me a video of a dog riding a skateboard," the search results may include a link to a video sharing website and/or a link to videos relating to a dog riding a skateboard. Alternatively, instead of performing a search, the method 300 may bypass blocks 345 and 350. For example, if the carrier phrase application 151 concludes that the parsed carrier phrase does not match and is not semantically similar to one of the known carrier phrases, the speech command module 111 may wait for additional speech input to be received.

In block 355, the speech command module 111 monitors and logs user actions to determine what, if any, action was intended by the user's speech input. For example, the speech command module 111 can monitor the user's selection of one of the links provided by the speech command module 111 in block 340 or one of the search result links provided in block 350. If the links provided in block 340 include a link to perform a search using the speech input, the speech command module 111 may monitor the user's selection of results from such a search in block 350. The speech command module 111 also can monitor for other actions unrelated to the provided links. For example, the user may not have intended for any of the actions corresponding to the matched carrier phrase to be completed. In such a case, the user may complete the action manually, rather than by voice command. The speech command module 111 can monitor and log these actions in block 355. In certain exemplary embodiments, the speech command module 111 may monitor and log the first action taken by the user only. In certain exemplary embodiments, the speech command module 111 may monitor and log multiple actions taken by the user. In block 360, the speech command module 111 updates the list or network of known carrier phrases based on the user's actions logged in block 355, and the method 300 ends. Block 360 is described in further detail below with reference to FIG. 4.

In certain exemplary embodiments, the speech command module 111 can monitor sequences of commands or queries and find similarities between them. If a user attempts multiple phrases until a link to the intended action is provided, each of the phrases can be processed by the speech command module 111 to determine the phrase's relevancy to the intended action. For example, a user may attempt to get driving directions to New York City by first speaking the phrase, "Drive to New York City" into the microphone 113. If there is not match to this phrase or to the phrase, "Drive to," in the known carrier phrases, then the speech command module 111 may provide Internet search results only. The user may then try only the phrase, "New York City." The Internet search results for "New York City" may include a link to a map of New York City. If the user selects the map link and then selects a link to "get driving directions," the speech command module 111 can record this and provide this information to the carrier phrase application 151. The carrier phrase application 151 can, in turn, correlate the phrase "Drive to" from the first received speech input to the action "get driving directions." As would be readily understood by a person of ordinary skill in the art having the benefit of the present disclosure, infinite other sequences may occur in other exemplary embodiments.

Figure 4:
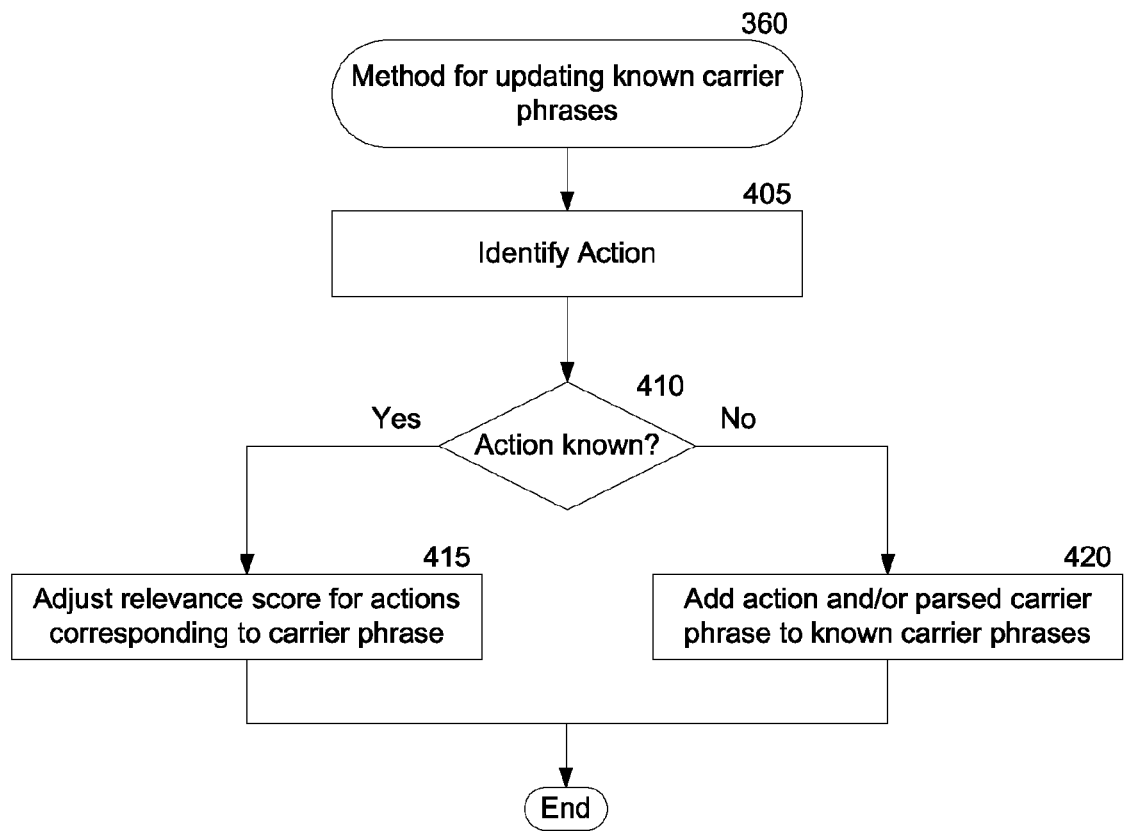
FIG. 4 is a flow chart depicting a method for updating known carrier phrases, in accordance with certain exemplary embodiments.

FIG. 4 is a flow chart depicting a method 360 for updating known carrier phrases, in accordance with certain exemplary embodiments, as referenced in block 360 of FIG. 3. The method 360 is described hereinafter with reference to FIGS. 1-2, and 4.

In block 405, the speech command module 111 identifies the action intended by the user's speech input based on the monitoring in block 355 of FIG. 3. In block 410, the speech command module 111 determines whether the identified action corresponds to one of the known carrier phrases that matched the parsed carrier phrase in block 330. In certain exemplary embodiments, the speech command module 111 can identify a "match" only when the known carrier phrase identically matches the parsed carrier phrase. Alternatively, a match may exist when the known carrier phrase matches the parsed carrier phrase either identically or through semantic similarity. If the speech command module 111 determines in block 410 that the identified action corresponds to one of the known carrier phrases that matched the parsed carrier phrase in block 330, the method 360 branches to block 415. Otherwise, the method 360 branches to block 420.

In block 415, the speech command module 111 communicates the user selected action to the carrier phrase application 151, and the carrier phrase application 151 updates the list or network of known carrier phrases based on the user selected action. For example, the carrier phrase application 151 may increase the relevance score for the user selected action with respect to the matching carrier phrase. In addition, the carrier phrase application 151 may reduce the relevance score for non-selected actions corresponding to the matching carrier phrase. In certain alternative exemplary embodiments, the speech command module 111 may update the list or network itself.

In block 420, the speech command module 111 adds the new, parsed carrier phrase and/or the user selected action to the list or network of known carrier phrases. If the parsed carrier phrase did not match one of the known carrier phrases in block 330 of the method 300 and the user selected a search result link resulting from a search of the received speech input, then the parsed carrier phrase and the action associated with the selected search result link can be added to the list or network of known carrier phrases. For example, if the speech input from the user included the phrase, "Drive to New York," and the phrase "Drive to" is not included in the known carrier phrases, an Internet search for "Drive to New York" can be performed. If the user selects a link resulting from the search to a webpage that provided directions to New York, then a carrier phrase "Drive to" or a carrier phrase "Drive to <location>" may be added to the known carrier phrases with a corresponding action of "provide directions." Thereafter, if the phrase "Drive to" is received by the network device 110, the speech command module 111 and/or the carrier phrase application 151 can predict that the user intends to get directions to a location. In response, the speech command module 111 can provide a link to an Internet website that provides directions or can automatically cause an Internet web browser to navigate to the website that provides directions.

If the parsed carrier phrase matches a known carrier phrase, but the user selected an action that previously did not correspond to the matching known carrier phrase, then that user selected action can be added as a corresponding action for the matching known carrier phrase. Thereafter, this new action may be identified and/or suggested when the carrier phrase is received by the network device.

General

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

The exemplary embodiments can be used with computer hardware and software that performs the methods and processing functions described above. As will be appreciated by those skilled in that art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method comprising:
    identifying a particular term from a transcription of speech data;

determining that (i) the particular term is not included as a key term in a grammar that references key terms that correspond to an action, and (ii) the particular term is semantically similar to a particular key term that is referenced in the grammar as corresponding to the action;

receiving data validating that the particular term corresponds to the action; and in response to determining that (i) the particular term is not included as a key term in the grammar, and (ii) the particular term is semantically similar to the particular key term that is referenced in the grammar as corresponding to the action, and further in response to receiving the data validating that the particular term corresponds to the action, adjusting, by one or more computers, (a) a relevance score for the action and the particular key term to indicate that the particular term that is not included as a key term in the grammar has increased relevance to the action, and (b) a relevance score for a different action and a key term associated with the different action to indicate that the particular term has decreased relevance to the different action.

2. The computer-implemented method of claim 1, comprising:

in response to receiving the data validating that the particular term corresponds to the action, performing the action associated with the grammar.

3. The computer-implemented method of claim 1, comprising:

in response to determining that (i) the particular term is not included as a key term in the grammar, and (ii) the particular term is semantically similar to the particular key term that is referenced in the grammar as corresponding to the action, and before receiving data validating that the particular term corresponds to the action, providing a graphical output to a user that requests input from the user validating that the particular term corresponds to the action.

4. The computer-implemented method of claim 3, wherein the graphical output includes a hyperlink, and wherein the input from the user comprises a user selection of the hyperlink.

5. The computer-implemented method of claim 1, wherein the data validating that the particular term corresponds to the action indicates that the particular term corresponds to the action and comprising:

adding the particular term as a key term in the grammar as a term that corresponds to the action; and after adjusting the relevance score for the action and the particular key term to indicate that the particular term that is not included as a key term in the grammar has increased relevance to the action:

identifying the particular term from a transcription of second speech data;

determining that the particular term is included as a key term in the grammar that references key terms that correspond to the action; and performing the action associated with the grammar.

6. The computer-implemented method of claim 1, wherein the data validating that the particular term corresponds to the action comprises information about the relevance of the particular term to the action associated with the grammar.

7. The computer-implemented method of claim 6, further comprising:

identifying the particular term from a transcription of second speech data;

determining that the relevance score for the particular term exceeds a threshold value; and in response to determining that the relevance score for the particular term exceeds the threshold value, performing the action associated with the grammar.

8. The method of claim 1, further comprising:

before receiving data validating that the particular term corresponds to the action, determining that the relevance score for the action and the particular key term satisfies a relevance score threshold; and based on determining that the relevance score for the action and the particular key term satisfies the relevance score threshold, performing the action associated with the grammar.

9. A system comprising:

one or more computers and one or more storage devices storing instructions that are operable, when executed by the one or more computers, to cause the one or more computers to perform operations comprising:

identifying a particular term from a transcription of speech data;

determining that (i) the particular term is not included as a key term in a grammar that references key terms that correspond to an action, and (ii) the particular term is semantically similar to a particular key term that is referenced in the grammar as corresponding to the action;

receiving data validating that the particular term corresponds to the action; and in response to determining that (i) the particular term is not included as a key term in the grammar, and (ii) the particular term is semantically similar to the particular key term that is referenced in the grammar as corresponding to the action, and further in response to receiving the data validating that the particular term corresponds to the action, adjusting (a) a relevance score for the particular action and the particular key term to indicate that the particular term that is not included as a key term in the grammar has increased relevance to the action and (b) a relevance score for a different action and a key term associated with the different action to indicate that the particular term has decreased relevance to the different action.

10. The system of claim 9, wherein the operations comprise:

in response to receiving the data validating that the particular term corresponds to the action, performing the action associated with the grammar.

11. The system of claim 9, wherein the operations comprise:

in response to determining that (i) the particular term is not included as a key term in the grammar, and (ii) the particular term is semantically similar to the particular key term that is referenced in the grammar as corresponding to the action, and before receiving data validating that the particular term corresponds to the action, providing a graphical output to a user that requests input from the user validating that the particular term corresponds to the action.

12. The system of claim 11, wherein the graphical output includes a hyperlink, and wherein the input from the user comprises a user selection of the hyperlink.

13. The system of claim 9, wherein the data validating that the particular term corresponds to the action indicates that the particular term corresponds to the action and wherein the operations further comprise:

adding the particular term as a key term in the grammar as a term that corresponds to the action; and after adjusting the relevance score for the action and the particular key term to indicate that the particular term that is not included as a key term in the grammar has increased relevance to the action:
   identifying the particular term from a transcription of second speech data;
   determining that the particular term is included as a key term in the grammar that references key terms that correspond to the action; and
   performing the action associated with the grammar.

14. The system of claim 9, wherein the data validating that the particular term corresponds to the action comprises information about the relevance of the particular term to the action associated with the grammar.

15. The system of claim 14, wherein the operations further comprise:
   identifying the particular term from a transcription of second speech data;
   determining that the relevance score for the particular term exceeds a threshold value; and
   in response to determining that the relevance score for the particular term exceeds the threshold value, performing the action associated with the grammar.

16. A non-transitory computer-readable medium storing software comprising instructions executable on one or more computers which, upon such execution, cause the one or more computers to perform operations comprising:
   identifying a particular term from a transcription of speech data;
   determining that (i) the particular term is not included as a key term in a grammar that references key terms that correspond to an action, and (ii) the particular term is semantically similar to a particular key term that is referenced in the grammar as corresponding to the action;
   receiving data validating whether that the particular term corresponds to the action; and
   in response to determining that (i) the particular term is not included as a key term in the grammar, and (ii) the particular term is semantically similar to the particular key term that is referenced in the grammar as corresponding to the action, and further in response to receiving the data validating that the particular term corresponds to the action, adjusting (a) a relevance score for the particular action and the particular key term to indicate that the particular term that is not included as a key term in the grammar has increased relevance to the action, and (b) a relevance score for a different action and a key term associated with the different action to indicate that the particular term has decreased relevance to the different action.

17. The computer-readable medium of claim 16, wherein the operations comprise:
   in response to receiving the data validating that the particular term corresponds to the action, performing the action associated with the grammar.

18. The computer-readable medium of claim 16, wherein the operations comprise:
   in response to determining that (i) the particular term is not included as a key term in the grammar, and (ii) the particular term is semantically similar to the particular key term that is referenced in the grammar as corresponding to the action, and before receiving data validating that the particular term corresponds to the action, providing a graphical output to a user that requests input from the user validating that the particular term corresponds to the action.

19. The computer-readable medium of claim 18, wherein the graphical output includes a hyperlink, and wherein the input from the user comprises a user selection of the hyperlink.

20. The computer-readable medium of claim 16, wherein the data validating that the particular term corresponds to the action indicates that the particular term corresponds to the action and wherein the operations further comprise:
   adding the particular term as a key term in the grammar as a term that corresponds to the action; and
   after adjusting the relevance score for the action and the particular key term to indicate that the particular term that is not included as a key term in the grammar has increased relevance to the action:
     identifying the particular term from a transcription of second speech data;
     determining that the particular term is included as a key term in the grammar that references key terms that correspond to the action; and
     performing the action associated with the grammar.

21. The computer-readable medium of claim 16, wherein the data validating that the particular term corresponds to the action comprises information about the relevance of the particular term to the action associated with the grammar.

22. The computer-readable medium of claim 21, wherein the operations further comprise:
   identifying the particular term from a transcription of second speech data;
   determining that the relevance score for the particular term exceeds a threshold value; and
   in response to determining that the relevance score for the particular term exceeds the threshold value, performing the action associated with the grammar.

23. The computer-implemented method of claim 1, wherein adjusting, by one or more computers, the relevance score for the action and the particular key term to indicate that the particular term that is not included as a key term in the grammar has increased relevance to the action comprises:
   increasing the relevance score for the action and the particular key term to indicate that the particular term that is not included as a key term in the grammar has increased relevance to the action, after the data validating that the particular term corresponds to the action indicates that the particular term corresponds to the action.

24. A computer-implemented method comprising:
   identifying a particular term from a transcription of speech data;
   determining that the particular term is not included as a key term in a grammar that references key terms that correspond to an action;
   providing at least a portion of the transcription of the speech data as a search query to a search engine;
   receiving one or more search results responsive to providing the at least the portion of the transcription of the speech data as a search query to the search engine;
   receiving data indicating a user selection of a particular search result from among the one or more search results;
   determining that an action associated with the particular search result selected by the user corresponds to the action associated with the grammar; and
   in response to determining that the action corresponding to the particular search result selected by the user corresponds to the action associated with the grammar, adjusting, by one or more computers, (a) a relevance score for the action and the particular key term to indicate that the particular term that is not included as a key term in the grammar has increased relevance to the action, and (b) a relevance score for a different action and a key term associated with the different action to indicate that the particular term has decreased relevance to the different action.

* * * * *

UNITED STATES PATENT AND TRADEMARK OFFICE
CERTIFICATE OF CORRECTION

PATENT NO.         : 8,738,377 B2
APPLICATION NO.    : 12/795257
DATED              : May 27, 2014
INVENTOR(S)        : William J. Byrne, Alexander H. Gruenstein and Douglas H. Beeferman It is certified that error appears in the above-identified patent and that said Letters Patent is hereby corrected as shown below:

In the Claims

In Column 14, Line 37, Claim 9, delete "action" and insert -- action, --, therefor.

Signed and Sealed this
Seventh Day of October, 2014

Michelle K. Lee
*Deputy Director of the United States Patent and Trademark Office*